No. 693,845. Patented Feb. 25, 1902.
J. T. DEMPSEY.
LOADING OR UNLOADING APPARATUS.
(Application filed Dec. 11, 1901.)
(No Model.) 2 Sheets—Sheet 1.
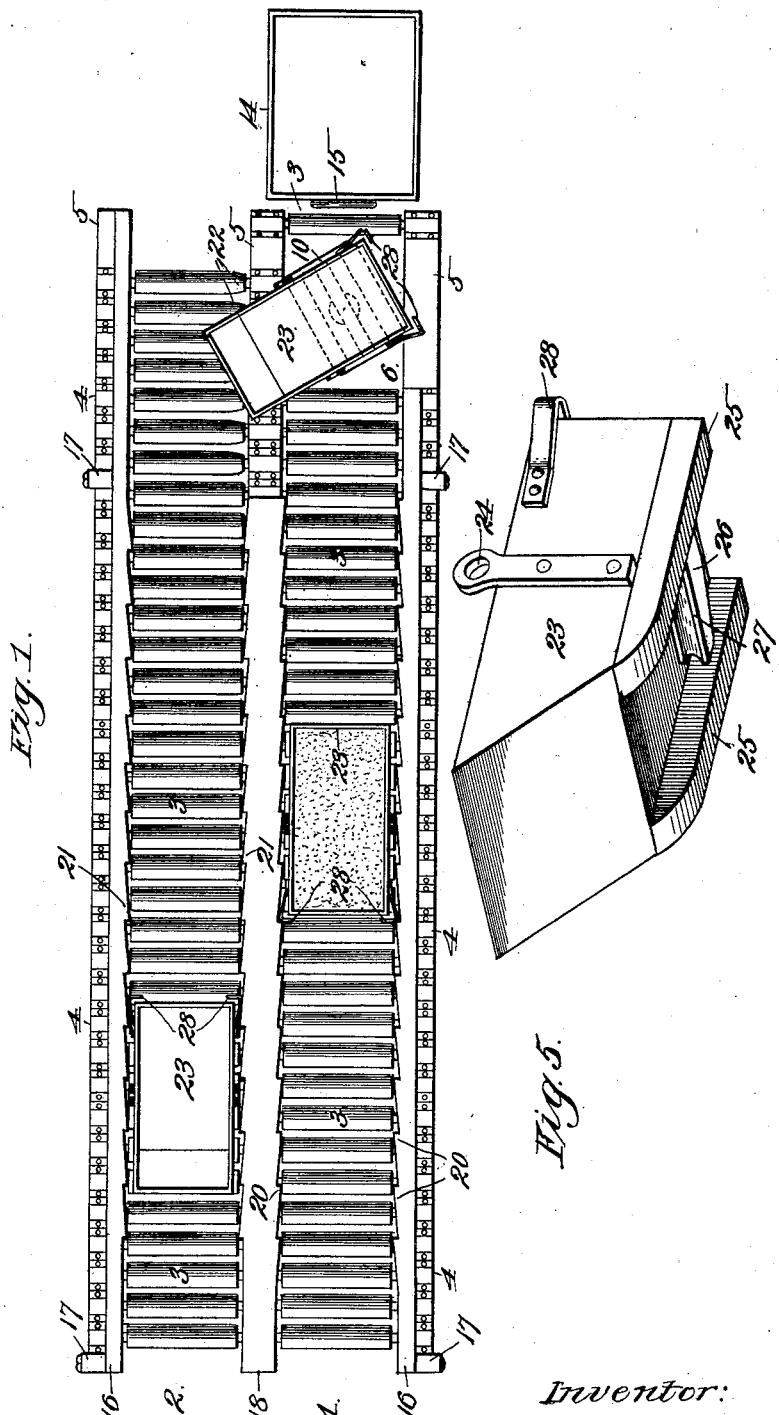
Witnesses:
Arthur McArthur
H.C. Rodgers
Inventor:
J. T. Dempsey
By Fischer & Thorpe
Attys.

No. 693,845. Patented Feb. 25, 1902.
J. T. DEMPSEY.
LOADING OR UNLOADING APPARATUS.
(Application filed Dec. 11, 1901.)
(No Model.) 2 Sheets—Sheet 2.
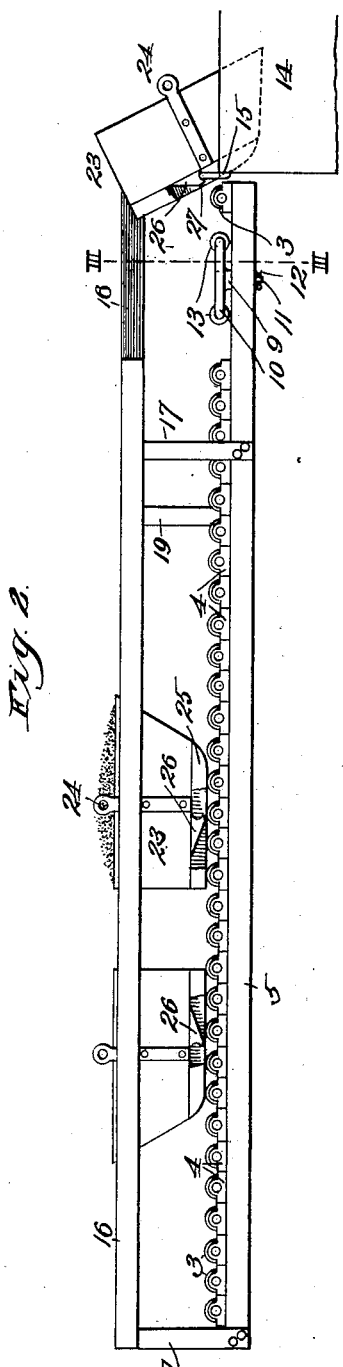
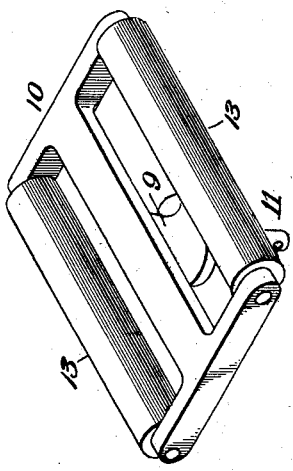
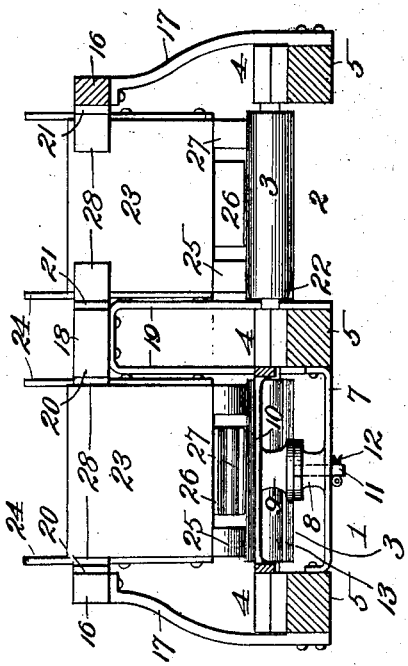
Witnesses:
Arthur McArthur
H. C. Rodgers
Inventor.
J. T. Dempsey
By Fischer & Thorpe
attys.

UNITED STATES PATENT OFFICE.

JAMES T. DEMPSEY, OF KANSAS CITY, KANSAS, ASSIGNOR OF ONE-HALF TO PATRICK W. CAREY, OF KANSAS CITY, KANSAS.

LOADING OR UNLOADING APPARATUS.

SPECIFICATION forming part of Letters Patent No. 693,845, dated February 25, 1902.

Application filed December 11, 1901. Serial No. 85,495. (No model.)

*To all whom it may concern:*

Be it known that I, JAMES T. DEMPSEY, a citizen of the United States, residing at Kansas City, in the county of Wyandotte and State of Kansas, have invented certain new and useful Improvements in Loading and Unloading Apparatus, of which the following is a specification.

My invention relates to loading and unloading apparatus; and my object is to produce a structure of this character which will materially facilitate the loading of heavy material—such as cement, sand, concrete, &c.—into receptacles supported in a plane above that where the loading-buckets are charged—for instance, where the platform and receptacle form a part of a wheeled machine used for making, discharging, and laying concrete or granitoid.

Other objects of the invention will hereinafter appear; and it consists in certain novel and peculiar features of construction and combinations of parts, as hereinafter described and claimed, and in order that it may be fully understood reference is to be had to the accompanying drawings, in which—

Figure 1 is a top plan view of a loading and unloading apparatus embodying my invention. Fig. 2 is a side elevation of the same. Fig. 3 is an enlarged cross-section. Fig. 4 is an enlarged detail perspective view of the swiveled roller-carrying frame forming a part of said apparatus. Fig. 5 is an enlarged perspective view of one of the sliding buckets to operate on said platform.

Referring now to the drawings in detail, 1 designates the loading, and 2 the unloading, passage of the platform, the bottom of each passage of the platform being composed of transverse rollers 3, journaled in bearings 4, secured upon parallel sills 5.

At the front end of passage 1 an opening 6 is bridged at the lower side of sills 5 by a cross-bar 7, having a central vertically-perforated boss or table 8, and mounted upon the latter is a depending boss or table 9 of an I-shaped frame 10, a swivel or pivotal relation between said tables being secured by means of a pin 11, depending from table 9 through boss or table 8, the pin being secured reliably in place by a spring-cotter 12, engaging its lower end. Said swiveled or pivoted frame carries a pair of rollers 13, which normally are parallel with rollers 3 to receive and support the sliding buckets hereinafter referred to, which are adapted to discharge their contents in the receptacle 14, of any suitable type, said receptacle having at its side contiguous to the platform an upwardly-projecting stop-bar 15.

16 designates upper side rails of the platform, the same being parallel with side sills 5 and supported from the same by means of metallic standards 17. A central rail 18 is supported vertically above the central sill 5 by means of an inverted-U-shaped bracket 19. The opposing edges of the rails 16 and 17 of passage 1 are formed with forwardly-disposed ratchet-teeth 20, said rail 16 terminating at the rear end of opening 6, while rail 18 terminates somewhat short of the rear end of said opening for a purpose which is hereinafter explained. The rail 16, flanking passage 2, may be of the same length as sills 5, if desired, and its inner edge and the opposing edge of rail 18 is formed with ratchet-teeth 21, which are disposed rearwardly or in the opposite direction to the teeth 20 of passage 1, and forward of rail 18 the ends of rollers 3 of passage 2 are preferably tapered, as shown at 22, for a purpose which hereinafter appears.

The buckets 23, used in connection with this apparatus, preferably have their front ends pitched at an angle, so as to facilitate the discharge of their contents, and are provided with side bars 24, whereby they may be conveniently lifted by hand or other power to be placed in passage 1 of the platform. They are provided with runners 25 at their lower side and with a cross-bar 26 hollowed at its front side, so as to form a hook 27 for engagement with a stop-bar 15.

In practice as fast as the buckets are deposited in passage 1 of the platform with their front ends toward receptacle 14 an attendant pushes them forward to a second attendant standing near receptacle 14, the impetus gained by the first application of force carrying each bucket, if on a short platform, to the swiveled roller-carrying frame 10. The attendant contiguous to the receptacle draws the bucket forward until its hook 27 engages and is arrested by stop-bar 15, at which time it rests upon the swiveled frame and the roller or rollers thereof at the front side of opening 6 and therefore contiguous to receptacle 14. The operator with but little exertion then tilts the bucket, so as to discharge its contents into said receptacle, and then reverses such tilting operation and draws it slightly rearward until it rests wholly upon the rollers of the swiveled frame. The latter is then turned to about the angle shown in Fig. 1 and the bucket shoved off into passage 2, such movement being both laterally and rearwardly of the machine, so that the front end of the bucket will be presented toward the rear end of the machine, the beveled ends 22 of the advanced rollers of passage 2 facilitating this operation. Either of the attendants referred to can now easily adjust the empty bucket at right angles to the rollers and give a shove which will carry it toward the discharge or rear end of passage 2, where it is lowered by hand or otherwise to be recharged.

Where this platform is used as a part of a wheeled machine, it is obvious that the vibration of the latter might tend to jolt the buckets, loaded or unloaded, in the opposite direction to that which they should follow. This would not only delay the accomplishment of the work in hand, but might perhaps endanger workmen standing below the machine. To obviate this difficulty, I provide the ratchets 20 and 21, hereinbefore described, and the spring-catches 28, secured to the rear sides and ends of the buckets, which catches successively engage the ratchet-teeth and thus absolutely guard against back motion from jolting or any other cause, it being understood that the springs are so light that they offer but little frictional resistance to the forward movement.

From the above description it will be apparent that while I have illustrated and described the preferred embodiment of the invention, I wish it to be understood that it is susceptible of change in various particulars without departing from the principle of construction involved.

Having thus described the invention, what I claim as new, and desire to secure by Letters Patent, is—

1. A loading and unloading apparatus, consisting of two passages communicating at one end; a stop-bar at the front end of one passage; and a bucket to travel in said passage toward said end, provided with a depending hook for pivotal engagement with said stop-bar, substantially as described.

2. A loading and unloading apparatus, consisting of two passages communicating at one end, one of said passages being provided with forwardly-disposed ratchet-teeth, and the other with rearwardly-disposed ratchet-teeth; a stop-bar at the front end of the passage having the forwardly-disposed ratchet-teeth; a bucket mounted to travel forwardly in the passage having the forwardly-disposed ratchet-teeth, and rearwardly in the passage having the rearwardly-disposed ratchet-teeth, and provided with a depending hook for frictional engagement with said stop-bar; and spring-catches for successive engagement with the ratchet-teeth of said passages, substantially as described.

3. A loading and unloading apparatus, comprising a platform consisting of two passages communicating at one end, one passage having a bottom opening at its front or communicating end; a swiveled roller-carrying frame mounted in said opening; a stop-bar at the front end of said passage; and a bucket arranged to travel in said passages and upon said swiveled roller-carrying frame, and provided with a depending hook for engagement with said stop-bar.

4. A loading and unloading apparatus, comprising a pair of passages communicating at their front ends, and having a roller-bottom, the bottom of one passage at its front end being provided with an opening, and the contiguous ends of the rollers at the front end of the other passage being beveled or tapered; a swiveled frame mounted in said opening and provided with rollers; and a bucket to slide upon the roller-bottom of the platform and upon the rollers of said swiveled frame, substantially as described.

5. A loading and unloading apparatus, comprising a platform, consisting of two passages having roller-bottoms for said passages; upper side rails for said passages, the middle one forming the inner side rail of each passage and terminating short of the front end of the same; a swiveled roller-carrying frame at the front end of one passage; and rollers at the corresponding end of the other passage, tapered at their ends contiguous to said swiveled frame, substantially as described.

In testimony whereof I affix my signature in the presence of two witnesses.

JAMES T. DEMPSEY.

Witnesses:
H. C. RODGERS,
G. Y. THORPE.